United States Patent
Tsutsui

(10) Patent No.: US 7,821,451 B2
(45) Date of Patent: Oct. 26, 2010

(54) POSITIONING APPARATUS AND POSITIONING METHOD

(75) Inventor: Masanao Tsutsui, Kanagawa (JP)

(73) Assignee: Sony Corporation (JP)

( * ) Notice: Subject to any disclaimer, the term of this patent is extended or adjusted under 35 U.S.C. 154(b) by 91 days.

(21) Appl. No.: 12/231,499

(22) Filed: Sep. 3, 2008

(65) Prior Publication Data

US 2009/0066575 A1    Mar. 12, 2009

(30) Foreign Application Priority Data

Sep. 6, 2007    (JP) ............................ P2007-231970

(51) Int. Cl.
   *G01S 19/42*    (2010.01)
   *G01C 21/00*    (2006.01)

(52) U.S. Cl. ................. 342/357.25; 701/207

(58) Field of Classification Search ............ 342/357.01, 342/357.06, 357.12, 357.15, 357.17; 701/207, 701/213
   See application file for complete search history.

(56) References Cited

U.S. PATENT DOCUMENTS

2007/0263981 A1    11/2007    Ueno et al.

2008/0186166 A1 *  8/2008    Zhou et al. ............. 340/539.13
2009/0054075 A1 *  2/2009    Boejer et al. ............. 455/456.1

FOREIGN PATENT DOCUMENTS

| JP | 8-327718 A     | 12/1996 |
| JP | 10-038993 A    | 2/1998  |
| JP | 10-073650 A    | 3/1998  |
| JP | 2001-074494 A  | 3/2001  |
| JP | 2001-091628 A  | 4/2001  |
| JP | 2001-309418 A  | 11/2001 |
| JP | 2002-156438 A  | 5/2002  |
| JP | 2004-003877 A  | 1/2004  |
| JP | 2004-347432 A  | 12/2004 |
| JP | 2005-207888 A  | 8/2005  |
| JP | 2007-158886 A  | 6/2007  |
| JP | 2007-219368 A  | 8/2007  |

\* cited by examiner

*Primary Examiner*—Dao L Phan
(74) *Attorney, Agent, or Firm*—Lerner, David, Littenberg, Krumholz & Mentlik, LLP

(57) ABSTRACT

A positioning apparatus includes: a position computing part configured to receive signals from a plurality of radio transmitters to compute a position of the positioning apparatus; a reception status determining part configured to determine a reception state of the signals from the plurality of the radio transmitters; and an intermittent drive setting part configured to set a time interval for receiving signals by the position computing part according to the reception state determined by the reception status determining part.

9 Claims, 3 Drawing Sheets

POSITIONING APPARATUS AND POSITIONING METHOD

CROSS REFERENCES TO RELATED APPLICATIONS

The present invention contains subject matter related to and claims the benefit of the filing date of Japanese Patent Application JP 2007-231970 filed in the Japanese Patent Office on Sep. 6, 2007, the entire contents of which is incorporated herein by reference.

BACKGROUND OF THE INVENTION

1. Field of the Invention

The present invention relates to a positioning apparatus and a positioning method.

2. Description of the Related Art

For the positioning apparatus, for example, there is a car navigation system using GPS, and the car navigation system determines positions at one second intervals, for instance. In addition, a portable terminal having a positioning apparatus incorporated therein determines positions at five second intervals, for example, and some of them are capable of intermittent drive. Here, the intermittent drive is drive that intends to save electric power consumed in receiving positioning data by starting and stopping receiving positioning data.

For example, JP-A-H10-38993 (Patent Reference 1) discloses a technique in which in a navigation system, for instance, the cycle of intermittent drive is changed according to the rate of travel of a mobile unit having a positioning apparatus. In addition, JP-A-2007-158886 (Patent Reference 2) discloses a technique in which in an imaging apparatus having a positioning function using GPS, the cycle of intermittent drive is changed according to the frequency of shoots by a user.

SUMMARY OF THE INVENTION

In the case of the car navigation system, since the system is supplied with power all the time by a power supply unit, for example, which is mounted on a vehicle, no problem arises with regard to power consumption even though positions are determined for a relatively short time such as one second intervals. On the other hand, in a positioning apparatus such as a portable terminal that uses a built-in battery as a power supply, it is necessary to intend to save electric power by performing intermittent drive.

The positioning apparatus may not determine positions when the positioning apparatus can receive no radio waves such as radio waves from GPS satellites. Therefore, in the case in which a positioning apparatus is placed at a location where the positioning apparatus can receive no radio waves such as in the interior of a room or underground, when the positioning apparatus continues to determine positions, the positioning apparatus is turned into a standby state in which the positioning apparatus is on standby for receiving radio waves. Then, in the case in which this standby state continues for a long time, a problem arises that electric power is wasted although it may be impossible to determine positions.

In addition, for example, even though the techniques disclosed in Patent Reference 1 and Patent Reference 2 are used to intend to save electric power, since these techniques make no considerations to the reception of radio waves at the location where positions may not be determined, a problem arises that effective control over power savings is not conducted.

It is desirable to provide a novel, improved positioning apparatus and positioning method which can conduct power savings in the case in which a signal from a radio transmitter may not be received.

A positioning apparatus according to an embodiment of the invention includes: a position computing part configured to receive signals from a plurality of radio transmitters to compute a position of the positioning apparatus; a reception status determining part configured to determine a reception state of the signals from the plurality of the radio transmitters; and an intermittent drive setting part configured to set a time interval for receiving signals by the position computing part according to the reception state determined by the reception status determining part.

With this configuration, the position computing part receives signals from a plurality of radio transmitters to compute a position of the positioning apparatus, the reception status determining part determines a reception state of the signals from the plurality of the radio transmitters, and the intermittent drive setting part sets a time interval for receiving signals by the position computing part according to the reception state determined by the reception status determining part.

In the positioning apparatus, the intermittent drive setting part may shorten the time interval for receiving signals as the number of the radio transmitters from which signals can be received in the plurality of the radio transmitters is larger.

In the positioning apparatus, when the reception status determining part determines that signals can be received from three or more of the radio transmitters in the plurality of the radio transmitters, the intermittent drive setting part may set the time interval for receiving signals to a first interval.

In the positioning apparatus, when the reception status determining part determines that signals can be received from one or two of the radio transmitters in the plurality of the radio transmitters, the intermittent drive setting part may set the time interval for receiving signals to a second interval longer than the first interval.

In the positioning apparatus, when the reception status determining part determines that it may be impossible to receive signals from any of the plurality of the radio transmitters, the intermittent drive setting part may set the time interval for receiving signals to a third interval longer than the second interval.

In the positioning apparatus, when a time period equal to or longer than a predetermined threshold elapses after the third interval is set, the intermittent drive setting part may set the time interval for receiving signals to a time period longer than the third interval.

In the positioning apparatus, the positioning apparatus may further include: a navigation information acquiring part configured to acquire navigation information about the radio transmitter having a term of validity, wherein when the term of validity of the navigation information is expired, or when a time period until the term of validity of the navigation information is expired is shorter than a predetermined time period, the intermittent drive setting part may set the time interval for receiving signals to a time period longer than the second interval or the third interval.

In the positioning apparatus, the number of the radio transmitters from which signals can be received in the plurality of the radio transmitters may be a value of a moving average of the number of the radio transmitters from which signals are being received in a predetermined period.

In the positioning apparatus, the positioning apparatus may further include: an intermittent display drive setting part configured to display at least one of a reception state of the signals from the plurality of the radio transmitters and a time interval for receiving signals by the position computing part, according to the number of the radio transmitters from which signals can be received in the plurality of the radio transmitters.

In addition, a positioning method according to an embodiment of the invention includes the steps of: receiving signals from a plurality of radio transmitters to compute a position of an positioning apparatus; determining a reception state of the signals from the plurality of the radio transmitters; and setting a time interval for receiving the signals according to the reception state.

According to the embodiments of the invention, power consumption can be reduced when a signal from a radio transmitter cannot be received.

DESCRIPTION OF THE PREFERRED EMBODIMENTS

Hereinafter, preferred embodiments of the invention will be described in detail with reference to the drawings. In addition, in the specification and the drawings, components having substantially the same functional configuration are designated the same numerals and signs, omitting the descriptions.

1. Configuration of a First Embodiment

Figure 1:
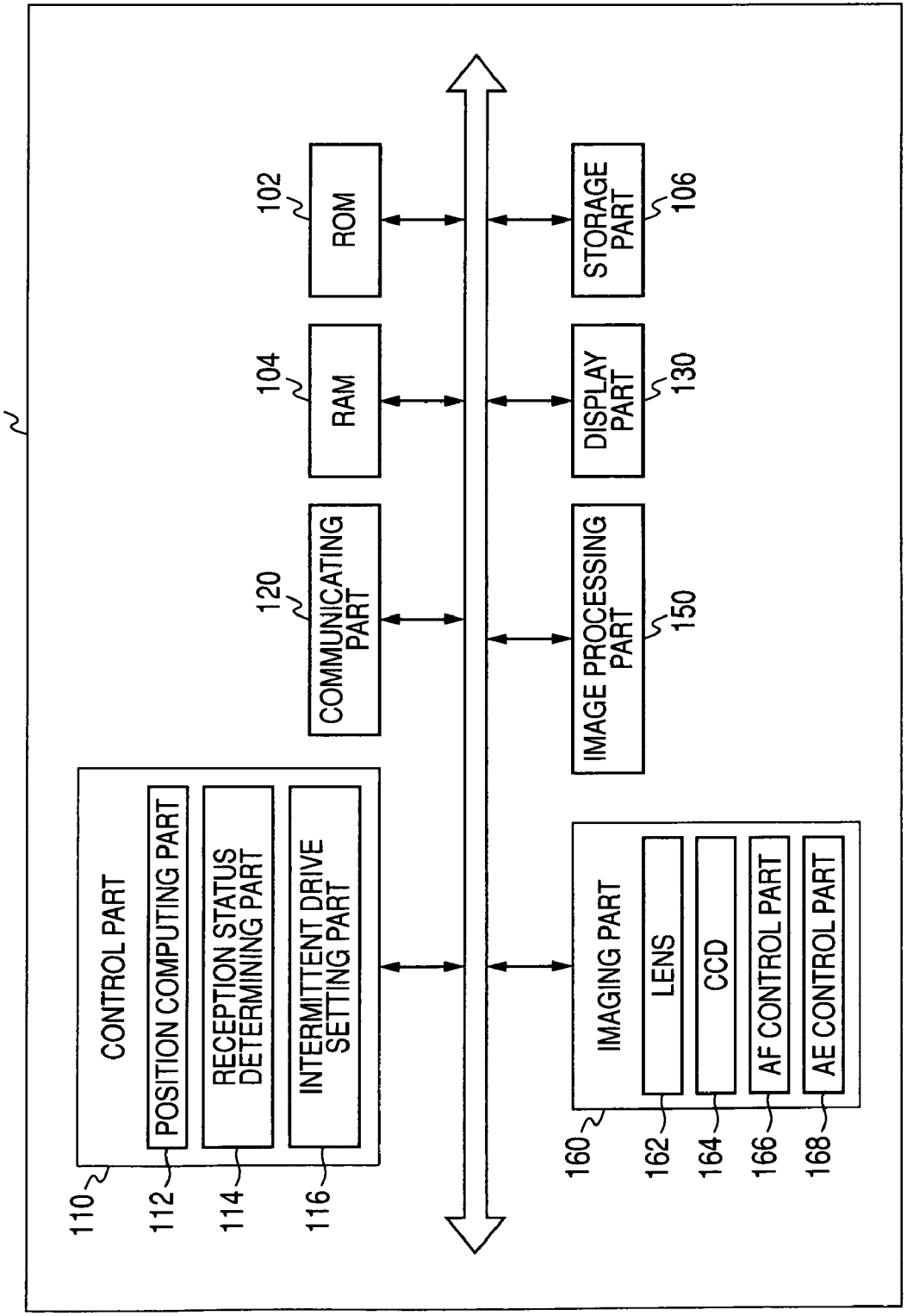
FIG. 1 shows a block diagram depicting a GPS positioning apparatus according to a first embodiment of the invention.

First, a GPS positioning apparatus 100 according to a first embodiment of the invention will be described. FIG. 1 shows a block diagram depicting the positioning apparatus according to the embodiment.

The GPS positioning apparatus 100 is an example of a position information acquiring apparatus, which uses GPS to receive radio waves from GPS satellites, and acquires a current position. For example, the GPS positioning apparatus 100 has a ROM (Read Only Memory) 102, a RAM (Random Access Memory) 104, a storage part 106, a control part 110, a communicating part 120, a display part 130, an image processing part 150, and an imaging part 160.

The ROM 102 stores therein a program and operation parameters used by the control part 110. The RAM 104 temporarily stores therein a program used in operation by the control part 110 and parameters changed as necessary in the operation.

The storage part 106 is a data storage device, which may include a recording medium, a recording device for recording data on a recording medium, a reader for reading data out of a recording medium, and an eraser for erasing data recorded on a recording medium. For example, the storage part 106 is a flash memory or a HDD (Hard Disk Drive). The storage part 106 drives a recording medium to store a program executed by the control part 110 and various items of data. In addition, the storage part 106 stores therein position information data acquired by the communicating part 120 and image data taken by the imaging part 160. In addition, the storage part 106 may be detachable from the GPS positioning apparatus 100.

For example, the control part 110 is a microprocessor such as a CPU (Central Processing Unit), which functions as a processor and a controller, and controls overall operations in the GPS positioning apparatus 100 in accordance with various programs.

As shown in FIG. 1, for example, the control part 110 has functional blocks including a position computing part 112, a reception status determining part 114, and an intermittent drive setting part 116.

The position computing part 112 receives signals from a plurality of GPS satellites (radio transmitters), and computes the position of the GPS positioning apparatus 100. The reception status determining part 114 determines the reception state of signals from the plurality of the GPS satellites. The intermittent drive setting part 116 sets a time interval for receiving signals and determining positions by the position computing part 112, according to the reception state determined by the reception status determining part 114.

The communicating part 120 receives radio waves from GPS satellites, and acquires position information. For example, position information is the latitude, longitude and altitude of the current position. In addition, the communicating part 120 acquires an ephemeris which is navigation information of GPS satellites. The ephemeris is data having a term of validity. For example, in the case in which the term of validity is two hours from the time of day at which an ephemeris is acquired, the GPS positioning apparatus 100 starts acquiring an ephemeris when two hours have elapsed from the time of day at which the previous ephemeris is acquired.

The display part 130 is configured of a display means such as an LCD. For example, the display part 130 displays thereon position information data acquired through the communicating part 120, or displays thereon images taken by the imaging part 160. In addition, various settings of the GPS positioning apparatus 100 can be set through the display on the display part 130.

Figure 2:
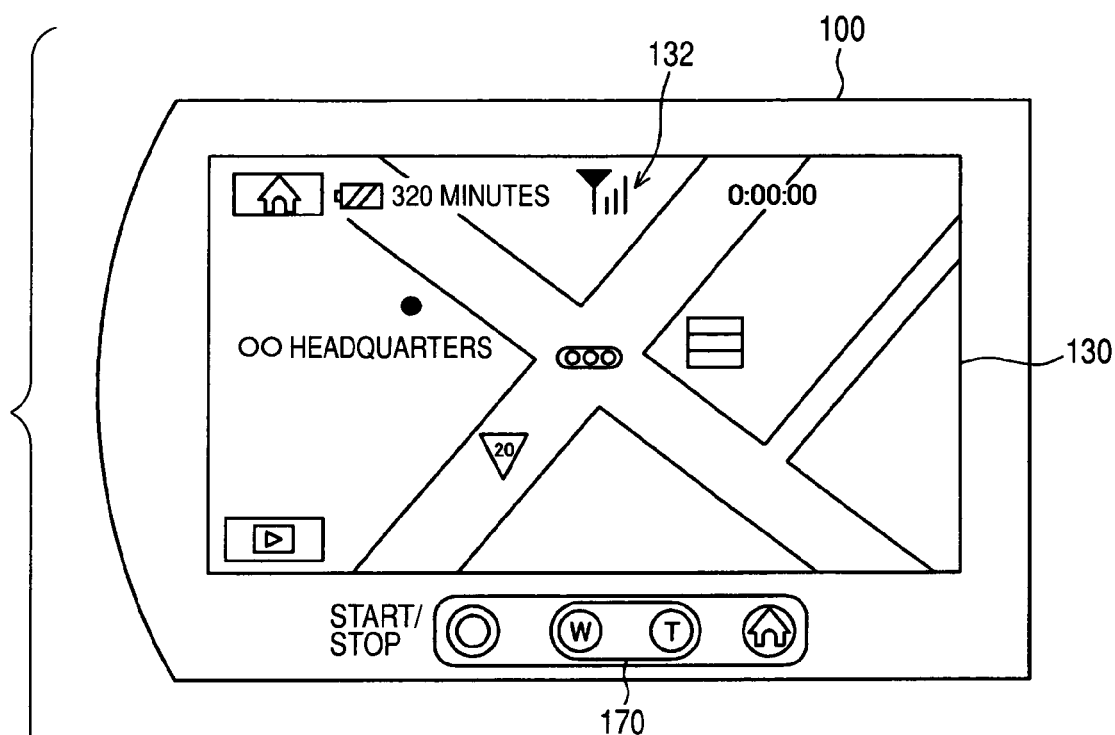
FIG. 2 shows an illustration depicting an exemplary display of a receive state according to the embodiment.

As shown in FIG. 2, on the screen of the display part 130, the results determined by the reception status determining part 114 from the reception state of signals from the plurality of the GPS satellites are displayed. For example, information such as the number of the satellites from which signals can be received, the state of being able to determine positions, and the state of being unable to determine positions is used to display a GPS signal reception state indication 132 in accordance with five stages of display methods. In the GPS signal reception state indication shown in FIG. 2, the number of radio waves shows the number of the satellites from which signals are received, in which in the case in which there is a disabled icon, it shows the state of being unable to determine positions, whereas in the case in which there is no disabled icon, it shows the state of being able to determine positions. As described above, showing the state of being able to determine positions tells that position information is acquired at normal positioning intervals. In addition, near the display part 130, a manipulating part 170 is provided to allow switching displays and establishing various settings.

The image processing part 150 subjects image data outputted from a CCD 164, for example, to processes such as gain correction of light quantity, edge processing for images (edge enhancement process), and white balance adjustment. The image processing part 150 performs imaging processing to generate image streams.

For example, the imaging part 160 has a lens 162, a CCD (charge coupled device) 164, an AF control part 166, and an AE control part 168. In the imaging part 160, a subject image is formed on the CCD 164 through the lens 162. In addition, the AF control part 166 detects a focus position to drive a focus lens for focus control. Based on the light quantity applied to the CCD 164, the AE control part 168 performs exposure control. In addition, in the embodiment, the CCD 164 is used as an imaging device, but a CMOS (Complementary Metal Oxide Semiconductor) device may be used, or the other image sensors may be used.

In addition, for the GPS positioning apparatus 100 described above, although such an example is described that the GPS positioning apparatus 100 is combined with the imaging unit configured to include the imaging part 160 and the image processing part 150, the embodiment of the invention is not limited to this example. The imaging unit may be a separate unit from the GPS positioning apparatus 100, or the embodiment of the invention may have such a configuration in which image data is sent and received between the imaging unit and the GPS positioning apparatus 100.

2. Operation of the First Embodiment

Figure 3:
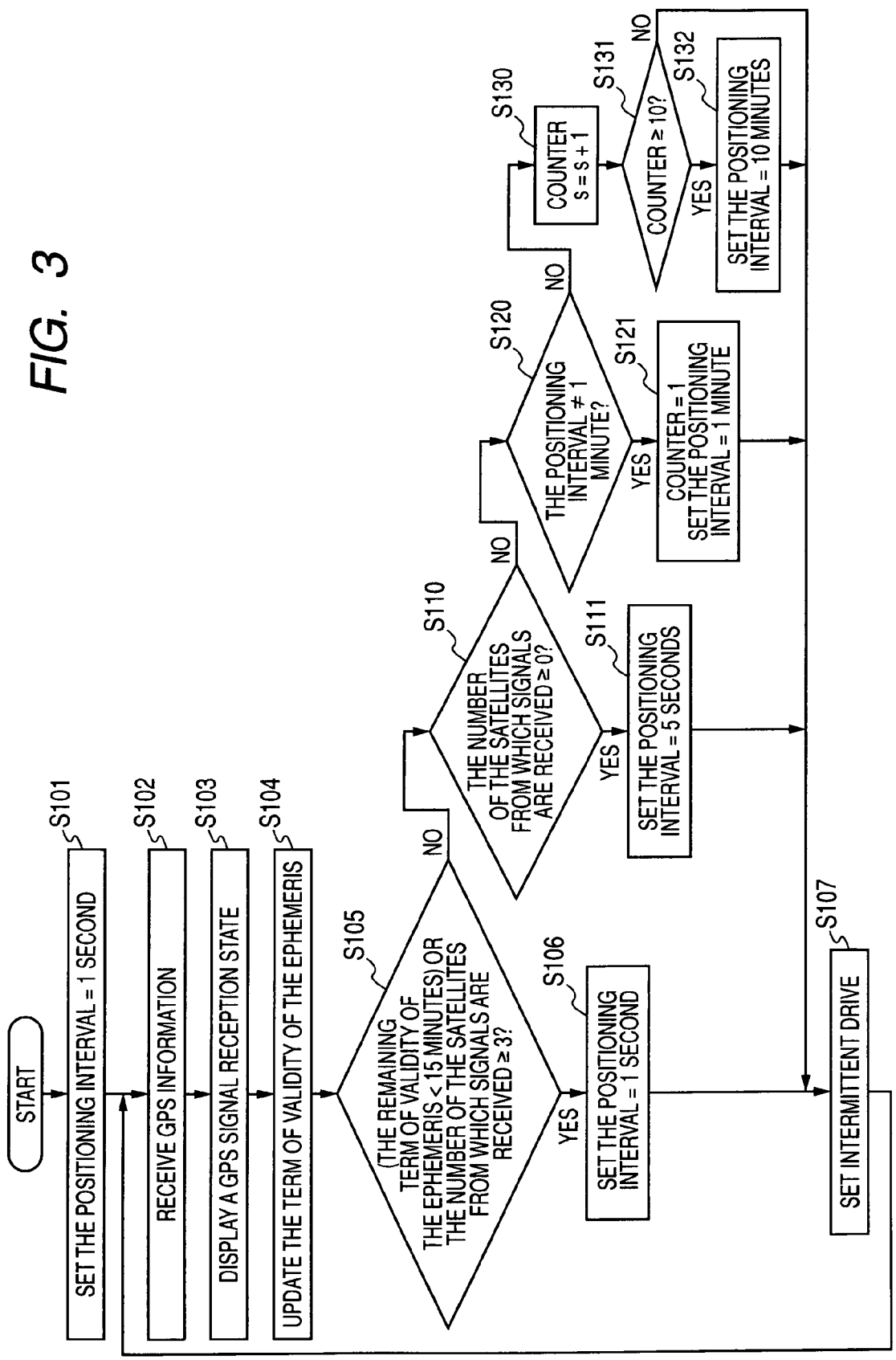
FIG. 3 shows a flow chart depicting a positioning process of the GPS positioning apparatus according to the embodiment.

Next, the operation of the GPS positioning apparatus according to the first embodiment of the invention 100 will be described. FIG. 3 shows a flow chart depicting a positioning process of the positioning apparatus according to the embodiment.

First, as the initial state of the GPS positioning apparatus 100, the intermittent drive setting part 116 sets the time interval to one second in which the position computing part 112 receives signals from GPS satellites (radio transmitters) for determining positions (Step S101). When the positioning interval is one second intervals, the GPS positioning apparatus 100 can measure changes in its position correctly.

Subsequently, the position computing part 112 receives signals from the GPS satellites (Step S102). Then, the reception status determining part 114 determines the reception state of the signals from the plurality of the GPS satellites, and displays the result on the screen of the display part 130 as shown in FIG. 2 (Step S103).

In addition, the communicating part 120 acquires an ephemeris that is navigation information of the GPS satellites. The ephemeris is data having a term of validity, and the information is updated to new one when a new ephemeris is received (Step S104). In the case in which no ephemeris is acquired from the GPS satellites, the actual positioning operation is not performed by the position computing part 112, and no position may be acquired. Therefore, when the term of validity is expired from the time of day at which the previous ephemeris is acquired, it is necessary to start acquiring an ephemeris.

In addition, immediately after the GPS positioning apparatus 100 is started, in order to determine whether the GPS positioning apparatus 100 is in an environment in which signals from the GPS satellites can be acquired excellently, the normal positioning state may be continued for about one minute. After that, it is sufficient that the mode is changed to an intermittent drive control mode, described later.

Subsequently, the term of validity of the acquired ephemeris is confirmed, and then it is determined whether the remaining term of validity is less than 15 minutes, for example (Step S105). If the remaining term of validity is less than 15 minutes, the positioning interval is set to one second regardless of the reception state of the signals from the GPS satellites (Step S106).

In the state in which the ephemeris is valid, position determination can be started within a few seconds, whereas in the case in which the ephemeris is invalid, it takes time for at least about 40 seconds or longer. Thus, it is important that the ephemeris is valid all the time.

In the case in which the term of validity of the ephemeris is included in the determining conditions as in Step S105, when the state of being unable to receive signals is returned to the state of being able to receive signals as described above, there is a merit that position determination can be started within a short time. However, the positioning interval is set to one second intervals in the state of being unable to receive signals, which leads to wasting power. Therefore, a user may set whether to include the term of validity of the ephemeris in the determining conditions.

In addition, in Step S105, it is determined whether the number of the GPS satellites from which the GPS positioning apparatus 100 can receive signals (the number of the satellites from which signals can be received) is three or greater regardless of the term of validity of the ephemeris. If the number of the satellites from which signals are received is three or greater, since the GPS positioning apparatus 100 is in the state in which it can determine positions by triangulation, for example, the positioning interval is set to a normal interval (first interval), one second, for example (Step S106). In addition, when the number of the satellites from which signals are received is four or greater, the GPS positioning apparatus 100 is in the state in which it can reliably determine positions.

On the other hand, if the number of the satellites from which signals are received is below three, it is determined whether the number of the satellites from which signals are received is greater than zero (Step S110). In other words, when the number of the satellites from which signals are received is one or two, the GPS positioning apparatus 100 is in the state in which it can receive signals to some extent, but may not reliably determine positions. At this time, the positioning environment of the GPS positioning apparatus 100 is in the state in which the GPS positioning apparatus 100 is located between buildings or there is an obstacle to temporarily interfere with the reception of signals in the surrounding environment. At this time, the positioning interval is set to an interval longer than one in Step S106 (second interval), five seconds, for example (Step S111). Thus, since the number of times of receiving signals to determine positions can be reduced, power can be saved in the state in which positions may not be temporarily determined. In addition, in the case in which the number of the satellites from which signals are received is increased to be the state of being able to determine positions, the interval can be returned to the normal positioning intervals within a short time (five seconds at the longest).

On the other hand, in Step S110, it is determined that the number of the satellites from which signals are received is zero, the positioning environment of the GPS positioning apparatus 100 is in the state in which no signals can be received. Therefore, even though the positioning interval is set to one second or five seconds and an attempt is made to receive signals at every one second or five seconds, it is likely to waste power. Therefore, it is determined that the number of the satellites from which signals are received is zero, the positioning interval is set to one minute (third interval) (Step S121).

When the positioning interval is one minute, the interval can be returned to the normal positioning interval (for example, one second) within one minute at the longest at which the GPS positioning apparatus 100 goes outside of a building, and thus power savings and response to restarting determining positions can be compatible. In addition, in Step S121, a counter is initially set to one. Then, in the case in which the state of being unable to determine positions is continued, since it is determined in Step S120 that the positioning interval is one minute, the counter is incremented by one (Step S130).

Then, when the positioning mode at one minute intervals is continued for ten minutes or longer and the counter is ten or greater, the positioning interval is set to ten minutes (Step S132). In this state, since it may be impossible to determine positions according to GPS signals for a long time and it is likely that there is no chance to restart determining positions, the positioning interval is set longer as described above, whereby power savings can be reliably conducted.

As discussed above, when the positioning interval is set, the position computing part 112 determines positions in the intermittent drive mode (Step S107). The intermittent drive mode may be implemented by controlling power supply intervals to the position computing part 112.

In addition, in Step S110 described above, when the number of the satellites from which signals are received is compared, such a scheme may be possible that the number of the satellites from which signals are received is not recognized as zero until the state in which the number of the satellites from which signals are received is zero is continued ten times. This is because since the number of the satellites from which signals are received is generally changed in units of seconds, in the case in which the mode enters to the intermittent drive mode of one minute intervals because the number of the satellites from which signals are received for one time is zero, a problem arises in response to restarting determining positions.

According to the embodiment, in the case in which the reception level of the signals from the GPS satellites is excellent and the GPS positioning apparatus 100 is in the state of being able to determine positions, the GPS positioning apparatus 100 can be operated at drive intervals optimum to an application, for example. For example, for navigation purposes, the drive interval is one second intervals, and in a logging mode, the drive interval is five second intervals. Such a configuration may be provided that the drive interval can be changed depending on modes, which can also yield the advantage of power savings.

In addition, in the case in which the GPS positioning apparatus 100 is in the state in which no signals are received from the GPS satellites, for example, it is assumed that the GPS positioning apparatus 100 is located inside a building or underground, the positioning interval is set to an interval slightly longer than the normal interval. Consequently, when the GPS positioning apparatus 100 again enters in the state of being able to determine positions, position determination can be restarted at some following intervals, which allows more effective power savings. For example, this interval is one minute in the discussions above.

In addition, in the case in which the GPS positioning apparatus 100 is in the state in which some signals are received from the GPS satellites but it is difficult to determine positions, for example, it is assumed that the GPS positioning apparatus 100 is located between buildings or there is a temporary obstacle, when the GPS positioning apparatus 100 again enters in the state of being able to determine positions, position determination can be restarted as soon as possible as well as power savings can be conducted. For example, this interval is five seconds in the discussions above.

In addition, in the case in which the state in which no signals are received from the GPS satellites is continued for a long time, the positioning interval is set to a much longer interval, which allows further power savings. For example, this interval is ten minutes in the discussions above.

In addition, suppose that when the reception status determining part 114 determines the reception state, the number of the GPS satellites from which signals can be received is computed according to the moving average of the number of the GPS satellites from which signals are actually received in ten seconds, for example, an accurate reception state can be determined with no influence of a temporary receive state.

In addition, since the states of reception levels and positioning intervals can be confirmed on the display screen of the display part, a user can judge that positions can be determined by slightly changing the surrounding environment, which can encourage the user to move to the location at which positions can be determined. As described above, the user is allowed to know the internal state of the GPS positioning apparatus 100 and to take action complementary to determining positions.

As discussed above, the preferred embodiment of the invention has been described with reference to the accompanying drawings, but it is without saying that the embodiment of the invention is not limited this example.

It is apparent that one skilled in the art could achieve various variations and modifications within the scope of the appended claims and they are understood to be within the technical scope of the invention obviously.

For example, in the embodiment, it is specifically described that the positioning intervals are one second, five seconds, one minute, and ten minutes, but the embodiment of the invention will not be limited to these examples. For instance, intervals set in consideration of both of power consumption and response to restarting determining positions may be different time intervals.

For example, in the embodiment, the positioning apparatus is the GPS positioning apparatus 100, but the embodiment of the invention will not be limited to this example. For instance, the positioning apparatus may determine the current position according to determination technologies of acquiring information from an access point (a radio transmitter) using a wireless LAN.

It should be understood by those skilled in the art that various modifications, combinations, sub-combinations and alterations may occur depending on design requirements and other factors insofar as they are within the scope of the appended claims or the equivalents thereof.

What is claimed is:

1. A positioning apparatus comprising:
a position computing part configured to receive signals from a plurality of radio transmitters to compute a position of the positioning apparatus;
a reception status determining part configured to determine a reception state of the signals from the plurality of the radio transmitters; and
an intermittent drive setting part configured to set a time interval for receiving signals by the position computing part according to the reception state determined by the reception status determining part,
wherein the intermittent drive setting part shortens the time interval for receiving signals as the number of the radio transmitters from which signals can be received in the plurality of the radio transmitters is larger.

2. The positioning apparatus according to claim 1,
wherein when the reception status determining part determines that signals can be received from three or more of the radio transmitters in the plurality of the radio transmitters, the intermittent drive setting part sets the time interval for receiving signals to a first interval.

3. The positioning apparatus according to claim 2,
wherein when the reception status determining part determines that signals can be received from one or two of the radio transmitters in the plurality of the radio transmitters, the intermittent drive setting part sets the time interval for receiving signals to a second interval longer than the first interval.

4. The positioning apparatus according to claim 3,
wherein when the reception status determining part determines that it may be impossible to receive signals from any of the plurality of the radio transmitters, the intermittent drive setting part sets the time interval for receiving signals to a third interval longer than the second interval.

5. The positioning apparatus according to claim 4,
wherein when a time period equal to or longer than a predetermined threshold elapses after the third interval is set, the intermittent drive setting part sets the time interval for receiving signals to a time period longer than the third interval.

6. The positioning apparatus according to claim 4, further comprising:
a navigation information acquiring part configured to acquire navigation information about the radio transmitter having a term of validity,
wherein when the term of validity of the navigation information is expired, or when a time period until the term of validity of the navigation information is expired is shorter than a predetermined time period, the intermittent drive setting part sets the time interval for receiving signals to a time period longer than the second interval or the third interval.

7. The positioning apparatus according to claim 1,
wherein the number of the radio transmitters from which signals can be received in the plurality of the radio transmitters is a value of a moving average of the number of the radio transmitters from which signals are being received in a predetermined period.

8. The positioning apparatus according to claim 1, further comprising:
an intermittent display drive setting part configured to display at least one of a reception state of the signals from the plurality of the radio transmitters and a time interval for receiving signals by the position computing part, according to the number of the radio transmitters from which signals can be received in the plurality of the radio transmitters.

9. A positioning method comprising the steps of:
receiving signals from a plurality of radio transmitters to compute a position of an positioning apparatus;
determining a reception state of the signals from the plurality of the radio transmitters;
setting a time interval for receiving the signals according to the reception state; and
reducing the time interval for receiving signals as the number of the radio transmitters from the plurality of the radio transmitters increases.

* * * * *